United States Patent [19]

Lohr, Jr. et al.

[11] 3,855,164

[45] Dec. 17, 1974

[54] STABILIZED POLYBUTADIENE COMPOSITIONS

[75] Inventors: Delmar F. Lohr, Jr., Bedford Heights; Joseph A. Beckman, Franklin Township, both of Ohio

[73] Assignee: The Firestone Tire & Rubber Company, Akron, Ohio

[22] Filed: May 25, 1972

[21] Appl. No.: 257,028

[52] U.S. Cl. .................. 260/23.7 R, 260/33.6 PV
[51] Int. Cl. ..................... C08c 11/72, C08d 9/14
[58] Field of Search.... 260/23.7 R, 27 BB, 33.6 PV, 260/41.5 R, 4.2

[56] References Cited
UNITED STATES PATENTS

| | | | |
|---|---|---|---|
| 3,039,993 | 6/1963 | Friedman | 260/45.7 P |
| 3,256,237 | 6/1966 | Casey | 260/23.7 R |
| 3,511,795 | 5/1970 | Brodie | 260/23.7 R |
| 3,532,665 | 10/1970 | Gerson | 260/41.5 A |

FOREIGN PATENTS OR APPLICATIONS

| | | | |
|---|---|---|---|
| 575,754 | 5/1959 | Canada | 260/27 BU |

*Primary Examiner*—Donald E. Czaja
*Assistant Examiner*—William E. Parker

[57] ABSTRACT

The incorporation of a combination of a tri(hydrocarbyl) trithiophosphite and a calcium soap into polybutadiene resins greatly enhances the resistance thereof to heat deterioration.

16 Claims, No Drawings

STABILIZED POLYBUTADIENE COMPOSITIONS

FIELD OF THE INVENTION

This invention relates to butadiene polymer and copolymer resins, and more particularly to increasing the resistance of such resins to deterioration of the mechanical properties upon exposure to heat.

BACKGROUND OF THE INVENTION

Butadiene polymer and copolymer resins, particularly those having, in uncured state, a high proportion of butadiene units incorporated in 1,2-configuration, have come into considerable use, particularly as electrically insulating structural components, friction elements and the like. Particularly since these resins exhibit good mechanical properties, at least initially, at high temperatures, they are attractive candidates for applications in which they will be exposed to high temperatures. At temperatures above about 350° C., however, the mechanical properties of these resins tend to slowly degrade over a period of time, which excludes them from many applications for which they would otherwise be very suitable. To date, however, there does not appear to have been any successful development of enhanced heat-resistant resins of this type.

Accordingly, it is an object of this invention to increase the resistance of butadiene polymer and copolymer resins to deterioration by heat.

Another object is to provide such heat-resistant resins which will have physical and chemical properties undiminished in comparison with these resins as heretofore supplied.

A further object is to improve the heat resistance of such resins by incorporating therein modest amounts of compounding ingredients which are inexpensive and readily available, and which present no dangers or inconvenience involving toxicity, corrosiveness or the like.

SUMMARY OF THE INVENTION

The above and other objects are secured, in accordance with this invention in compositions comprising:

|  | Parts by Weight |
|---|---|
| Polybutadiene resin | 100 |
| A tri(hydrocarbyl)trithiophosphite | 0.5–4.0 |
| A calcium soap | 0.5–4.0 |

The composition being cured by heating with presence of:

A peroxide curing agent 0.5–6.0

Fillers may be used such as reinforcing and compounding ingredients such as glass fiber, glass fabric, asbestos, flame resisters, and the like.

DESCRIPTION OF THE PREFERRED EMBODIMENTS

The Polybutadiene Resins

These may be any resins which are based on polymers of butadiene or copolymers of butadiene with up to 60 percent, based on the copolymers, of styrene. Also minor proportions, say up to 15 percent based on the copolymer of other ethylenically unsaturated compounds may be incorporated in the copolymers. These resins are usually prepared by (co) polymerizing the monomers by means of anionic initiators to a relatively low molecular weight, say 1,000–200,000, so that they are of at least a flowable consistency. These low molecular weight (co) polymers are then incorporated with any desired fillers, reinforcing fibers or fabrics, pigments, etc. (including in case of the present invention, the tetrabromobenzene and/or adjuvants), peroxide or other curing agents if desired, etc., and the composite is cured under heat and pressure to produce the desired finished article.

More particularly, there have recently been developed a class of polybutadiene resins having at least 40 percent, and preferably at least 60 percent by weight, of butadiene in the polymer molecule, and having at least 80 percent by weight of the butadiene therein in the vinyl type of butadiene repeating unit structure. The average molecular weight (determined by intrinsic viscosity measurement) is at least 12,500 and the molecular weight distribution is such that at least 50 percent, and preferably 90 percent, of the polymer has a molecular weight above 10,000 and at least 95 percent has a molecular weight above 2,000. It has been found that the presence of higher proportions of lower molecular weight polymers than allowed by these limitations causes slow curing rates and poor physical properties in the cured product. For good processibility and good flow during molding the average molecular weight should be no greater than 55,000. This corresponds to an intrinsic viscosity of about 0.7 taken at 25° C. or about 0.68 taken at 30° C. The resin should also have a dilute solution viscosity of 0.2–0.7, preferably 0.3–0.6. The butadiene units are incorporated into the polymeric chain largely in the 1,2-configuration, preferably at least 80 percent of the butadiene units present being in this configuration. These polymers are cured by incorporating, per 100 parts of polymer, approximately 0.5–6 parts, and preferably 1.5–3.0 parts, by weight of dicumyl peroxide (or an equivalent weight of any other peroxide giving radicals of the structure $R_2(CH_3)CO-$, where R independently in each occurrence represents a hydrocarbon radical of 1–20 carbon atoms), and heating the polymers, usually under pressure. The curing temperature is advantageously at least 250° F. (120° C.), preferably about 300°–350° F. (150°–180° C.). Generally, no advantage in the process or product is obtained by exceeding a temperature of 420° F. (215° C.). Obviously, the higher the temperature the shorter will be the curing time required. Generally at 350° F. (180° C.) a satisfactory cure is obtained in less than 4 minutes, and in some cases even within a few seconds. Cure times of more than four minutes usually provide no added advantage. Where fast cures are desired it is necessary to use a filler to avoid crazing or cracking. A filler, such as silica, is advantageously used in the proportion of 25–65, preferably 40–60, volume per cent based on the combined resin-filler composition. Also the resins may be incorporated with glass fiber, either as chopped filler or else as glass fabric in a laminate, in which case the glass fiber will serve the purpose of a filler in preventing crazing and cracking on fast cures.

The Calcium Soap

This may be any calcium salt of a higher fatty acid containing from 8 to 26 carbon atoms such as calcium 2-ethylhexanoate, calcium octoate, calcium laurate, calcium myristate, calcium stearate, calcium palmitate, calcium oleate, calcium arachidate, calcium abietate, and mixtures of any two or more of such salts in any proportions.

The tri(hydrocarbyl)trithiophosphites may be any compounds of the formula (I) 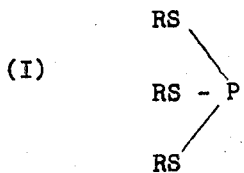

wherein

R, independently in each occurrence, represents a hydrocarbyl radical containing 1–25 carbon atoms. Examples of hydrocarbyl radicals which may occupy the situation indicated at R in Formula I are simple aliphatic hydrocarbon radicals such as ethyl, n-propyl, isopropyl, n-butyl, isobutyl, t-butyl, 2-ethyl hexyl, n-dodecyl, the mixed radicals derived from petroleum fractions or the reduction of natural fatty glycerides such as coconut oil or tallow, cycloaliphatic radicals such as cyclohexyl, methylcyclohexyl, the reduction products of naval stores, aromatic radicals such as phenyl, o-, p- and m-tolyl naphthyl and aralkyl radicals such as benzyl, phenylethyl and the like. Specific suitable compounds include, for instance (the preferred) trilauryl trithiophosphite, tristearyl trithiophosphite, tri(cyclohexyl) trithiophosphite, dilauryl sec-butyl trithiophosphite, triphenyl trithiophosphite, tri(o-tolyl) trithiophosphite, mixed trithiophosphites of the mixed radicals contained in alcohols produced by hydrogenation of coconut oil, tri(2-ethyl hexyl)trithiophosphite, tri(heneicosyl)trithiophosphite, and the like.

The Cured Resins

The cured resins produced in accordance with this invention have exceptional resistance to deterioration of physical properties, particularly modulus and flexural strength, upon long time exposure at high temperatures, i.e., temperatures above 400° F. and up to 700° F. Thus, the products, upon exposure to temperatures of 400° F. for 1,000 hours, or 600° F. for 100 hours, will retain upwards of 80 percent of their modulus and upwards of 60 percent of their flexural strength. The resins are therefore applicable in many situations where heat exposure is a factor, as in structural electrical components, cooking utensil handles, and automobile engine compartment components.

With the foregoing general discussion in mind, there are given herewith detailed experimental examples of the practice of this invention. All parts and percentages given are on the basis of weight, unless otherwise explicitly stated.

EXAMPLE I

|  | Parts by Weight |
|---|---|
| Polybutadiene* | 100 |
| Silica | 380 |
| Vinyl triacetoxysilane | 3 |
| Dicumyl peroxide | 3 |
| Hexane | 150 |
| Calcium stearate | 0–3.0 (per Table I) |
| Trilauryl trithiophosphite | 0–2.0 (per Table I) |

*90% of butadiene units in 1,2-configuration; molecular weight parameters $M_w = 29,000$, $M_n = 23,000$, DSV = 0.3.

A series of compositions was made up in accordance with the above schedule, varying the calcium stearate and trilauryl trithiophosphite in the several compositions as indicated in Table I. In the case of each composition, all of the ingredients in the proportions selected for that composition, were thoroughly mixed together, and the mixture poured into an evaporation dish to the depth of 0.5 inch. The dish was then placed in a vacuum oven, where the hexane was removed at 125° F. under a pressure of 1–5 mm. of mercury absolute. Each such dried composition was then removed and broken up, and molded in a compression mold into several test bars 1×3×0.1. Temperature of molding was 350° F., total load on the die was 10–20 tons normal to the 1×3 face, and time was 4 minutes. The modulus and flexural strength was determined upon control bars from each composition, and the average recorded in Table I with the notation "unexposed" to indicate that these bars were not exposed to heat degradation. Other bars of each composition were exposed in an air oven at 600° F. for 100 hours, and the modulus and flexural strength determined and also recorded in Table I with the notation "exposed". Following are the results:

TABLE I

| STABILIZING INGREDIENTS (parts by weight) | | HEAT EXPOSURE | FLEXURAL STRENGTH | | RUN NO |
|---|---|---|---|---|---|
| Calcium Stearate | Trilauryl Trithiophosphite | | psi | % Retention | |
| 0 | 1 | Unexposed | 10700 | — | 1 |
|  |  | Exposed | 1300 | 12 | 2 |
|  | 2 | Unexposed | 12300 | — | 3 |
|  |  | Exposed | 1200 | 24 | 4 |
| 0.5 | 0 | Unexposed | 10000 | — | 5 |
|  |  | Exposed | 1700 | 17 | 6 |
| 1 | 0 | Unexposed | 10400 | — | 7 |
|  |  | Exposed | 3400 | 33 | 8 |
|  | 2 | Unexposed | 11100 | — | 9 |
|  |  | Exposed | 6300 | 57 | 10 |
| 2 | 0 | Unexposed | 11400 | — | 11 |
|  |  | Exposed | 7000 | 61 | 12 |
|  | 1 | Unexposed | 10600 | — | 13 |
|  |  | Exposed | 7400 | 70 | 14 |
|  | 2 | Unexposed | 10500 | — | 15 |
|  |  | Exposed | 8500 | 81 | 16 |
|  | 3 | Unexposed | 11700 | — | 17 |
|  |  | Exposed | 9900 | 85 | 18 |
| 3 | 0 | Unexposed | 10700 | — | 19 |
|  |  | Exposed | 7200 | 67 | 20 |

TABLE I—Continued

| STABILIZING INGREDIENTS (parts by weight) | | HEAT EXPOSURE | FLEXURAL STRENGTH | | RUN NO |
|---|---|---|---|---|---|
| Calcium Stearate | Trilauryl Trithiophosphite | | psi | % Retention | |
|  | 1 | Unexposed | 10000 | — | 21 |
|  |   | Exposed | 9200 | 81 | 22 |
|  | 2 | Unexposed | 13200 | — | 23 |
|  |   | Exposed | 10000 | 77 | 24 |
|  | 3 | Unexposed | 12100 | — | 25 |
|  |   | Exposed | 9100 | 75 | 26 |

We claim:

1. Process of producing a heat-stabilized resin which comprises subjecting to curing temperatures a composition containing

| | Parts by Weight |
|---|---|
| A butadiene polymer or copolymer resin | 100 |
| A tri(hydrocarbyl)trithiophosphite | 0.5 – 4.0 |
| A calcium soap | 0.5 – 4.0 |
| A peroxide curing agent | 0.5 – 6.0 | the hydrocarbyl groups in said tri(hydrocarbyl)trithiophosphite containing 1-25 carbon atoms and being selected from the group consisting of aliphatic, cycloaliphatic, aromatic and aralkyl radicals, the resin being a homopolymer of butadiene or a copolymer of butadiene and styrene with an average molecular weight of at least 12,500, at least 50 percent of the resin having a molecular weight above 10,000 and at least 95 percent of the resin having a molecular weight above 2,000, and containing at least 40 percent by weight of butadiene with at least 80 percent of butadiene repeating units in the homopolymer or copolymer being in the 1,2 configuration, the calcium soap being a salt of abietic acid or a fatty acid containing 8 to 26 carbon atoms and the peroxide being one which gives radicals of the structure $R_2(CH_3CO.)CO.$ in which R represents a hydrocarbon radical of 1 to 20 carbon atoms.

2. Process according to claim 1, wherein the calcium soap is calcium stearate.

3. Process according to claim 1, wherein the peroxide curing agent is dicumyl peroxide.

4. Process according to claim 1, wherein proportions of tri(hydrocarbyl)trithiophosphite and calcium soap are more particularly

| | Parts by Weight |
|---|---|
| Tri(hydrocarbyl)trithiophosphite | 1.5–3.0 |
| Calcium soap | 2.0–3.5 |

5. Process according to claim 4, wherein the peroxide curing agent is dicumyl peroxide.

6. Process according to claim 4, wherein the tri(hydrocarbyl)trithiophosphite is trilauryl trithiophosphite.

7. A composition curable to a hard, heat stabilized resin comprising

| | Parts by Weight |
|---|---|
| A butadiene polymer or copolymer resin | 100 |
| A tri(hydrocarbyl)trithiophosphite | 0.5 – 4.0 |
| A calcium soap | 0.5 – 4.0 |
| A peroxide curing agent | 0.5 – 6.0 | the hydrocarbyl groups in said tri(hydrocarbyl)trithiophosphite containing 1-25 carbon atoms and being selected from the group consisting of aliphatic, cycloaliphatic, aromatic and aralkyl radicals, the resin being a homopolymer of butadiene or a copolymer of butadiene and styrene with an average molecular weight of at least 12,500, at least 50 percent of the resin having a molecular weight above 10,000 and at least 95 percent of the resin having a molecular weight above 2,000, and containing at least 40 percent by weight of butadiene with at least 80 percent of butadiene repeating units in the homopolymer or copolymer being in the 1,2-configuration, the calcium soap being a salt of abietic acid or a fatty acid containing 8 to 26 carbon atoms and the peroxide being one which gives radicals of the structure $R_2(CH_3)CO.$ in which R represents a hydrocarbon radical of 1 to 20 carbon atoms.

8. Composition according to claim 7, wherein the calcium soap is calcium stearate.

9. Composition according to claim 7, wherein the peroxide is dicumyl peroxide.

10. Composition according to claim 7, wherein the proportions of tri(hydrocarbyl)trithiophosphite and calcium soap are more particularly

| | Parts by Weight |
|---|---|
| A tri(hydrocarbyl)trithiophosphite | 1.5–3.0 |
| Calcium soap | 2.0–3.5 |

11. Composition according to claim 10, wherein the peroxide is dicumyl peroxide.

12. Composition according to claim 10, wherein the tri(hydrocarbyl)trithiophosphite is trilauryl trithiophosphite.

13. A peroxide-cured heat-stabilized resin containing therein

| | Parts by Weight |
|---|---|
| A butadiene polymer or copolymer resin | 100 |
| A tri(hydrocarbyl)trithiophosphite | 0.5 – 4.0 |
| A calcium soap | 0.5 – 4.0 | the hydrocarbyl groups in said tri(hydrocarbyl)trithiophosphite containing 1-25 carbon atoms and being selected from the group consisting of aliphatic cycloaliphatic, aromatic and aralkyl radicals, the resin being a homopolymer of butadiene or a copolymer of butadiene and styrene with an average molecular weight of at least 12,500, at least 50 percent of the resin having a molecular weight above 10,000 and at least 95 percent of the resin having a molecular weight above 2,000, and containing at least 40 percent by weight of butadiene with at least 80 percent of butadiene repeating units in the homopolymer or copolymer being in the 1,2-configuration, the calcium soap being a salt of abietic acid or a fatty acid containing 8 to 26 carbon atoms.

14. Cured resin according to claim 13, wherein the calcium soap is calcium stearate.

15. Cured resin according to claim 13, wherein the proportions of tri(hydrocarbyl)trithiophosphite and of calcium soap are more particularly

|  | Parts by Weight |
|---|---|
| Tri(hydrocarbyl)trithiophosphite | 1.5–3.0 |
| Calcium soap | 2.0–3.5 |

16. Cured resin according to claim 13, wherein the tri(hydrocarbyl)trithiophosphite is trilauryl trithiophosphite.

* * * * *

UNITED STATES PATENT OFFICE
CERTIFICATE OF CORRECTION

Patent No. 3,855,164          Dated December 17, 1974

Inventor(s) Delmar F. Lohr, Jr. & Joseph A. Beckman

It is certified that error appears in the above-identified patent and that said Letters Patent are hereby corrected as shown below:

In Column 4, Line 36, "1x3x0.1" should be -- 1"x3"x0.1" --

In Column 4, Line 37, "1x3" should be -- 1"x3"--

In Column 5, Line 40, "$R_2(CH_3CO.)CO.$" should be --$R_2(CH_3)CO.$--

Signed and sealed this 18th day of March 1975.

(SEAL)
Attest:

RUTH C. MASON
Attesting Officer

C. MARSHALL DANN
Commissioner of Patents
and Trademarks